United States Patent [19]
Siddiqui

[11] Patent Number: 5,453,326
[45] Date of Patent: Sep. 26, 1995

[54] POLYESTER FILM COATING WITH POLYAMIDO-POLYETHYLENEIMINE

[76] Inventor: Junaid A. Siddiqui, 5720 Turkey Oak Rd., Richmond, Va. 23237

[21] Appl. No.: 361,912

[22] Filed: Dec. 22, 1994

Related U.S. Application Data

[63] Continuation of Ser. No. 102,608, Aug. 5, 1993, abandoned.

[51] Int. Cl.$^6$ ........................................................ B32B 27/34
[52] U.S. Cl. ............................ 428/474.4; 428/475.2; 428/476.3; 528/170; 528/172; 528/182; 528/183; 528/228; 528/229; 528/295.3; 528/303
[58] Field of Search ................. 428/474.4, 475.2, 428/476.3, 480, 910; 528/170, 172, 182, 183, 228, 229, 295.3, 303

[56] References Cited

U.S. PATENT DOCUMENTS

| | | | |
|---|---|---|---|
| 3,755,497 | 8/1973 | Weedon et al. | 260/860 |
| 3,787,523 | 1/1974 | Crescentini et al. | 260/857 PG |
| 4,029,694 | 6/1977 | Weipert et al. | 260/475 P |
| 4,233,196 | 11/1980 | Sublett | 260/29.2 N |
| 5,156,904 | 10/1992 | Rice et al. | 428/219 |

FOREIGN PATENT DOCUMENTS

| | | | |
|---|---|---|---|
| 0458147 | 11/1991 | European Pat. Off. | C08J 7/04 |
| 127398 | 2/1990 | Japan . | |
| 1411564 | 10/1975 | United Kingdom | B05D 7/04 |

OTHER PUBLICATIONS

BASF Technical Bulletin, *Polymin SK*, BASF Corp. 1991; ©BASF Corp. Persippany, N.J.
BASF Technical Bulletin, *Polymin SNA*, BASF Corp. 1991; ©BASF Corp. Persippany, N.J.

*Primary Examiner*—Paul J. Thibodeau
*Assistant Examiner*—David Abraham

[57] ABSTRACT

The present invention relates to a polymeric film in-line coated with polyamido-polyethyleneimine to render the film receptive to direct extrusion coating with other polymers or to ink adhesion and to a method of making the same. Additionally, the present invention relates to an oriented polymeric film which has been in-line coated with polyamido-polyethyleneimine so that it has anti-static properties for other packaging applications.

7 Claims, 1 Drawing Sheet

POLYESTER FILM COATING WITH POLYAMIDO-POLYETHYLENEIMINE

This is a continuation of application Ser. No. 08/102,608 filed on Aug. 5, 1993, now abandoned.

BACKGROUND OF THE INVENTION

1. Field of the Invention

The present invention relates to polymeric film coated on at least one side with an aqueous based polyamido-polyethyleneimine primer coating composition. In particular, the present invention concerns oriented polymeric film coated (i.e. as one of the steps in the film formation process prior to heat setting of the film) with an aqueous based polyamido-polyethyleneimine, which renders the film more receptive to direct extrusion coating with other polymer layers, and to ink adhesion.

2. Prior Art

Oriented polymeric film, and particularly biaxially oriented polyethylene terephthalate (PET) film, has been widely used in packaging materials, magnetic tape applications, glazing applications, and reprographic film applications. It has good optical clarity, toughness and static properties which renders the film extremely suitable for these applications.

A major use of polymeric film is in lamination with other polymers. Often polyester film is extrusion coated with polyethylene, for example, to provide heat sealing or other properties not possible with polyester alone. Unfortunately, unprimed polymeric film is not very receptive to extrusion coating with other polymers. Most polymeric film is substantially inert and adhesion between the unprimed polymeric film and other extrusion coated polymers is poor.

Numerous primer coatings are known in the field for application to polymeric film to improve the adhesion of the film to various polymeric materials. Examples of such coatings include compositions based on vinylidene chloride polymers (U.S. Pat. No. 2,698,240), thermosetting acrylic or methacrylic polymers (U.S. Pat. No. 4,571,363), polyethyleneimine (U.S. Pat. No. 5,156,904) and like materials. Certain water dispersable co-polyesters have also been disclosed as adhesives for laminating sheets of polyester film to one another or to sheets of nylon film as taught in U.S. Pat. Nos. 3,563,942 and 3,779,993. Corona discharge treatment is also used with and without such primer coatings to achieve adhesion between the polymeric film and the extruded polymer layer.

In common practice, polyethyleneimine is used as an adhesive coating between various polymeric films, such as polypropylene film and other polymers as taught by U.S. Pat. No. 4,139,643 to Hix et al. The use of polyethyleneimine as an adhesive between cellophane and polyethylene is known from U.S. Pat. No. Re. 28,544 issued to Curler et al. Coating polyester film with polyethyleneimine by a converter for adhesion to extruded polyethylene is generally known. However, it is also known that the polyethyleneimine bond deteriorates rapidly to an unacceptable level under humid conditions. Thus, a converter will only employ polyethyleneimine, as a primer coating, when the laminate will not be exposed to prolonged humid conditions. These and other prior art applications for coating various polymeric films with polyethyleneimine are all performed by a converter rather than a film manufacturer.

In common practice for extrusion coating, a converter will corona treat polymeric film as received from the film manufacturer, coat the corona treated film with a primer coat, and then extrusion coat another polymer onto the film to form a laminate. This operation in which the primer is coated by a converter is called "off-line" coating. For a converter to off-line coat polymeric film with a primer coat requires expensive equipment. For example, a converter would need equipment to unwind the film, corona treat it, primer coat it, dry the primer coating, extrusion coat the primed film, cool the formed laminate, and rewind the film into a roll. In addition to equipment requirements, an off-line coating operation is time intensive and expensive.

Because of the above difficulties, it would be advantageous for a converter to obtain a ready-to-use treated and primed film, such that the primed film would be directly extrusion coatable without additional primer coating or corona treatment. In other words, it would be advantageous to the converter to receive a film from the manufacturer that merely required the converter to directly extrusion coat the desired polymeric material thereon to form a polymeric laminate.

A directly extrusion coatable polyester film is disclosed in U.S. Pat. No. 5,156,904. Disclosed is a polymeric film coated "in-line" with polyethyleneimine. This polyethyleneimine primer coating, however, has problems in that when applied in-line to the polymeric film substrate it sticks, due to poor static coefficient of friction, to the unprimed surface of the film. After the film is rolled-up on the take-up rolls, this sticking causes the film to tear and break during any subsequent operations on the film.

None of the prior references addresses the problem of producing an acceptable direct in-line primer coated polymeric film, that can be subsequently rolled and unrolled for further processing without experiencing edge tearing and breaking of the film. Moreover, none of the prior references teaches or suggests coating a polymeric film with a polyamido-polyethyleneimine primer coating such that a film suitable for receiving a coating is formed.

Accordingly, it is an object of this invention to provide a polymeric film having a polyamido-polyethyleneimine primer coating thereon.

It is also an object of this invention to provide an oriented, polymeric film which can be directly extrusion coated with other polymers, without the need for an additional primer coating or additional corona treatment, and can withstand prolonged humid conditions.

Another object of this invention is to provide a polymeric film having a chemically bonded polyamido-polyethyleneimine primer coating which is coated on the film prior to curing the polyester film.

Additionally, it is an object of this invention to provide a polymeric film, coated with an effective amount of polyamido-polyethyleneimine, to improve ink adhesion.

A still further object of this invention is to provide a polymeric film, coated with an effective amount of polyamido-polyethyleneimine, to improve the static properties of the film.

These and other objects may now be achieved with the present invention.

FIG. 3 is a cross-sectional view of the film with portion A the polyester film and portion B a coating and portion D a coating.

SUMMARY OF THE INVENTION

The present invention relates to a polymeric film coated with an effective amount of a polyamido-polyethyleneimine to render the film receptive to coating with other polymers or to ink adhesion and to a method of making the same. Additionally, the present invention relates to an oriented polymeric film which has been in-line coated with polyamido-polyethyleneimine so that it has anti-static properties for other packaging applications.

In one aspect, the present invention is directed to a process for coating polymeric film with an effective amount of polyamido-polyethyleneimine to render the film receptive to extrusion coating with one or more polymers or inks, or to render the film more anti-static, comprising the steps for forming a polymeric film and coating the polymeric film with polyamido-polyethyleneimine sufficient to improve the adhesion between the polymeric film and other polymers, the coating occurring prior to draw, interdraw or postdraw, but before heat setting the film.

Another aspect of the present invention is that it relates to a coated polymeric film capable of bonding with polymers or inks applied thereon, comprising an oriented polymeric film having an effective amount of a polyamido-polyethyleneimine coating applied during manufacturing of the film, sufficient to directly bond inks or extrusion coated polymers.

DETAILED DESCRIPTION OF THE INVENTION

Figure 1:
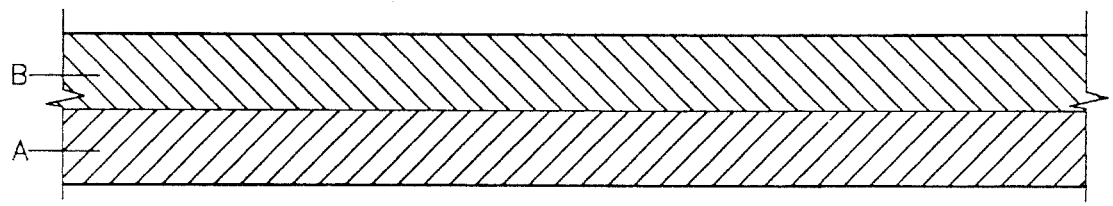
Figure 2:
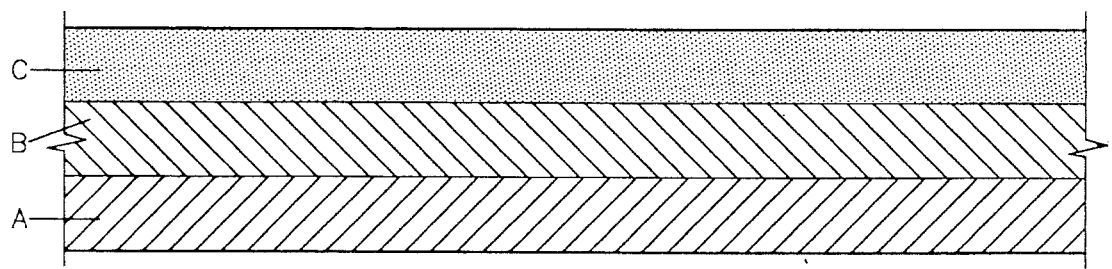
Figure 3:
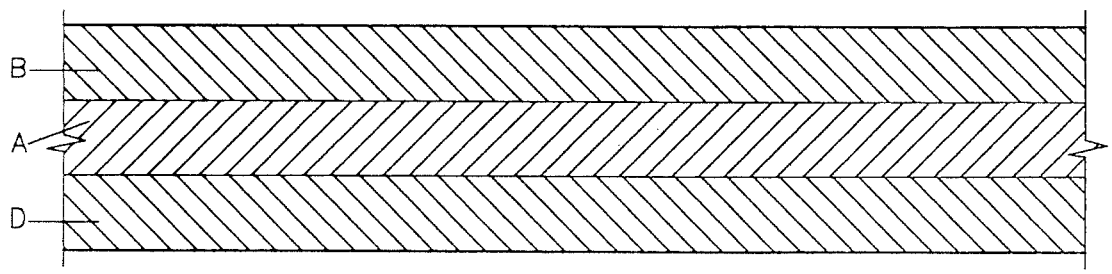

The present invention relates to a coated-oriented polyester film comprising a) oriented polyester film; and b) an effective amount of polyamido-polyethyleneimine coating on at least one side of said film and to a method of producing a coated-oriented polyester film by forming a polymer into a polyester film and coating an effective amount of polyamido-polyethyleneimine coating on at least on surface of said polyester film prior to heat setting the polymer.

The polymeric films of the present invention can be any thermoplastic film made from polyester, polyamide, polyolefin, polycarbonate, or the like. Preferably the films of the present invention are based on crystallizable polyester resulting from the polycondensation of a glycol or diol such as ethylene glycol or butane diol, and mixtures thereof, with terephthalic acid or dimethyl terephthalate, or mixtures of terephthalic acid and other dicarboxylic acids such as isophthalic acid, diphenic acid, sebacic acid, or their polyester forming equivalents, as known in the art, or mixtures of dimethyl terephthalate and other dicarboxylic acids such as isophthalic acid, diphenic acid and sebacic acid, or their polyester forming equivalents, as known in the art. Polyester film useful in the present invention may be polyethylene terephthalate, polypropylene terephthalate, and polybutylene terephthalate, or mixtures of these, or copolyester films in which any one of the above mentioned polyesters is present. For example, a copolyester film of polyethylene terephthalate and isophthalate (PETIP) is well known in the art and is within the scope of the present invention. A typical polyester film, for the purposes of the present invention, is polyethylene terephthalate (PET).

Although the present invention is typically directed to oriented polymeric films, a general description of polyester film will be employed to illustrate known conventional processes. In this process, polyester resin is melted and extruded as an amorphous sheet onto a polished revolving casting drum to form a cast sheet of the polymer. Thereafter, the film is heated to just above its glass transition temperature, 80° C. to 100° C., and is generally stretched or drawn in one or more directions. For example, the film may be stretched or drawn in the direction of extrusion (longitudinal direction), or perpendicular to the direction of extrusion (transverse direction), or both directions in which case biaxially oriented film is produced. The first stretching, which imparts strength and toughness to the film, conventionally ranges from about 2.0 to about 4.0 times its original length. If subsequent stretchings are employed, these stretchings can also range from about 2.0 to about 4.0 times the original size of the film. The film is then heat set at a temperature range generally between 190° C. to 240° C. to "lock in" the strength, toughness and other physical properties.

The thickness of polymeric film considered suitable for the present invention is generally less than about 250 microns, typically less than 175 microns, preferably less than 50 microns and most preferably in a range from 12 to 25 microns.

For purposes of the present invention, "in-line coating" means coating during the film manufacturing process, before heat setting the film. For purposes of the present invention, "off-line coating" means coating after the heat setting stage of film manufacturing.

The polyamido-polyethyleneimine coating of this invention is an aqueous based polymer, formed from a mixture of polyamide and polyamine polymers, such as that sold by BASF Corp. under the trademane POLYMIN SK, see schematic representation below. This modified polyethyleneimine polymer differs from the unmodified polyethyleneimine, as shown below, in that the primary amine groups are typically substituted with 20–25%, and preferably 100%, N-acetyl ($NHCOCH_3$) groups.

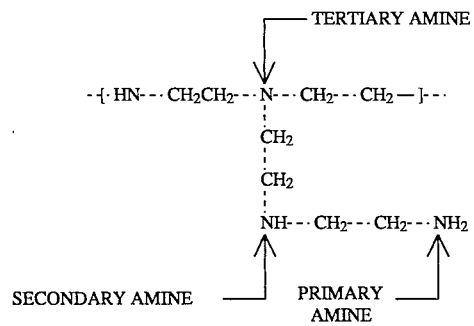

POLYETHYLENEIMINE AS BRANCHED POLYMER: SCHEMATIC REPRESENTATION OF A SECTION OF FOUR CHAIN UNITS

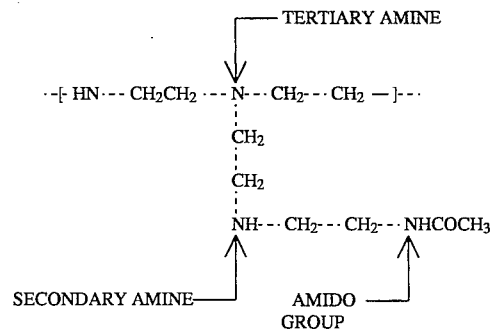

-continued
POLYAMIDO-POLYETHYLENEIMINE
AS BRANCHED POLYMER:
SCHEMATIC REPRESENTATION OF
A SECTION OF FOUR CHAIN UNITS An NMR analysis of Polyethyleneimine (PEI) and Polyamido-polyethyleneimine (PA-PEI) yielded the following results:

|  | PEI | PA-PEI |
|---|---|---|
| AMIDO GROUP | — | 19% |
| PRIMARY AMINE | 19% | — |
| SECONDARY AMINE | 39% | 39% |
| TERTIARY AMINE | 42% | 42% |

This polyamido-polyethyleneimine is easily formed into an aqueous solutions, which may be applied in-line during one of three stages of the film manufacturing process, namely; the predraw stage, between the casting of the amorphous sheet and the first stretch as disclosed, for example, in British Patent No. 1,411,564; the interdraw stage subsequent to the uniaxial drawing but prior to biaxially drawing, as disclosed in U.S. Pat. No. 4,571,363; or the postdraw stage subsequent to all stretching but prior to heat setting the film, as disclosed in U.S. Pat. No. 3,322,553. Normally, the heat applied to the film before the stretching and heat setting stages is sufficient to evaporate the water and other volatiles in the aqueous coating, leaving a dry coating on the film prior to winding the film.

For uniaxially drawn film, it is preferable to coat the film during a predraw stage. For a biaxially oriented film, it is preferable to coat the film after it is stretched in one direction, but prior to stretching in the orthogonal direction.

The polyamido-polyethyleneimine coating can be applied to polymeric film by any conventional method, such as spray coating, roll coating, slot coating, meniscus coating, immersion coating, and reverse gravure coating. Once the polyamido-polyethyleneimine primer coating has dried, the primed polymeric film, without further treatment, is receptive to direct extrusion coating with one or more polymers or is receptive to ink adhesion. The polyamido-polyethyleneimine coating serves to bond the polymeric film to the polymer extrudate thus forming a laminate, for packaging applications.

The polyamido-polyethyleneimine coating of the present invention is applied as an aqueous based solution at a concentration and amount sufficient to effectively adhere a subsequently applied polymeric coating. Such polymeric coatings may be applied by direct extrusion, as a laminate or any other conventional method. The polyamido-polyethyleneimine aqueous coating composition is typically used in a concentration of about 0.1 to about 6.0 percent, and typically from about 0.2 to about 3.0 percent, preferably 0.2 to about 0.9 percent by weight of polyamido-polyethyleneimine based upon the total weight of the coating composition. The polyamido-polyethyleneimine primer is typically applied such that it yields a final dry coating weight of from about $1\times10^{-8}$ to $2\times10^{-5}$ pounds of polyamido-polyethyleneimine per square feet of film surface. More typically, the amount of applied coating yields a final dry coating weight of about from $2\times10^{-8}$ to $1.0\times10^{-6}$ pounds of polyamid-polyethyleneimine per square foot of polymeric film surface.

The surface resistivity of this polyamido-polyethyleneimine coated film typically does not exceed $1.2\times10^9$ (Ohms), more typically the surface resistivity does not exceed $1.0\times10^{11}$ (Ohms) as measured by a Keithley Surface Resistivity meter Model 617 equipped with a Keithley Resistivity Adapter Model 6105.

The coating composition may also include other ingredients including additives that may further enhance the utility of the polyamido-polyethyleneimine coated film. Such other ingredients would include minor amounts of colloidal silica, dyes, pH regulating agents, wetting agents, and the like. Additionally, it may be advantageous to add aqueous compatible solvents such as methanol to the coating solution as a drying aid or as a thinner, etc. The coating is typically applied on the film as a continuous coating, which term is also intended to include the situation where the coating may form a continuous film or a plurality of islands or segregated regions of the coating.

The polyamido-polyethyleneimine coating of the present invention may be applied to one or both sides of the film, in one or two steps, or it may be applied to one side and a different coating such as a thermosetting acrylic or methacrylic coating as taught in U.S. Pat. No. 4,571,363 may be applied to the opposite side.

Laminates may be formed by any well known process, and particularly by direct extrusion coating where a molten sheet of polymer is continuously deposited on to a moving web of the coated polymeric film of the present invention. Laminates of polyester with polyethylene, ethylene-vinyl acetate copolymers, polyvinyl alcohol, polyvinyl acetate, and other polymers may be readily made by the extrusion coating process. A film of coated polyester which is extrusion coated with polyethylene has particularly useful properties such as good heat sealing capability or adhesion to other materials such as aluminum foil. The coated film of the present invention is also capable of adequately bonding to such difficult polymers as ionomer resins and particularly Surlyn® 1702, which is a zinc salt of an ethylene/organic acid copolymer supplied by E. I. Du Pont De Nemours & Co.

EXAMPLES

The following examples are illustrative of the invention:

In the examples PA-PEI refers to a polyamido-polyethyleneimine available from BASF Corp. under the trademark POLYMIN SK.

FILM PREPARATION

Polyethylene terephthalate (PET) polymer was melted and extruded through a slot die onto a cooled casting drum maintained at a temperature of about 20° C. The melted PET polymer solidified sufficiently to form a cast sheet. The cast sheet was longitudinally stretched at a draw ratio of approximately 3.2 to 1, at a temperature of about 80° C. The longitudinally drawn film was thereafter in-line coated by a rotating gravure roll with the polyamido-polyethyleneimine coating composition prepared as described above.

The longitudinally drawn, coated film was thereafter stretched in the transverse direction to a draw ratio of about 3.6 to 1 at a temperature of about 120° C. to produce a biaxially drawn film with a dried PA-PEI coating. The thickness of the biaxially drawn film was about 12 microns. The biaxially oriented drawn film was then heat set at a maximum temperature of about 220° C. The exposure of the coating to these elevated temperatures during the transverse draw and heat setting operations effectively drys the aqueous medium causing the coating to form a continuous uniform layer.

PREPARATION OF PA-PEI COATING COMPOSITION

A polyamido-polyethyleneimine coating composition was prepared by forming with ordinary tap water an aqueous solution of a specified percent by weight, as set forth in the examples, of polyamido-polyethyleneimine.

PREPARATION OF LAMINATE

To directly apply an extrusion coated polymer to the polyamido-polyethyleneimine coated PET film, the polymer was melted and extruded through a slot die onto the PET film running over a cooled casting drum maintained at a temperature of about 20° C. Generally the slot die is moved vertically with respect to the casting drum and back from top dead center, horizontally, toward the feeding direction of the PET film. For some polymers like LDPE, the position of the die slot does not greatly affect the strength of the laminate. For other polymers the position is important. After the extruded polymer solidified the laminate was tested for bond strength.

The laminate was cut into fifteen, approximately one-inch wide by about six inch long test strips and each side of the strips were backed with one inch wide Permacel tape to keep the sample from stretching and producing false bond strengths. An Instron Tensile Tester machine set to the following test conditions was used to measure the bond strength:

| Crosshead speed | 5.0 inches/min. |
| Chart speed | 10 inches/min. |
| Jaw separation | 1 inch |
| Load | 5 pounds |

EXAMPLE 1

A polyester film (Melinex 800 manufactured by ICI Americas Inc.) was coated with an aqueous solution containing 0.6 weight percent polyamido-polyethyleneimine (PA-PEI). The coating was done in-line during the film manufacturing process of the interdraw stage. After the coated film was prepared, a low density polyethylene (LDPE) was applied to the coated side of the polyester film by melting the LDPE at 125° C. and extruding it directly onto a running web of the coated polyester film to form a continuous layer of LDPE.

The LDPE coated polyester film was then tested for bond strength in grams per inch. The bond strengths were measured on the Instron Tensile Tester with the test conditions as above and the results are set forth in Table 1.

Additionally, the laminate was subjected to a reflux test to determine delamination. The reflux test was conducted for about 4 hours at about 100° C. at atmospheric conditions. The film sample size employed was approximately 7×10 inches in size and the amount of water in the reflux vessel was approximately 2 quarts. The results of these tests are set forth in Table 1 below.

TABLE 1

| Percent PA PEI Aqueous Solution | Bond Strength (grams/Inch) | Reflux Results |
|---|---|---|
| 0.6 | >1500 | No Delamination |

EXAMPLE 2

The coated polyester film was prepared as described above in Example 1. Instead of using polyethylene as the extrusion polymer, an ionomer resin (Surlyn® 1702, supplied by E. I. Du Pont De Nemours & Co.) was employed. The results are set forth in Table 2 below.

TABLE 2

| Percent PA-PEI Aqueous Solution | Bond Strength (grams Per Inch) | Reflux Results |
|---|---|---|
| 0.9 | >1500 | No Delamination |
| 0.3 | 540 | Delamination |

Note: — The results given in Tables 1 and 2 represent an average of fifteen tests.

The invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the invention.

What is claimed is:

1. A polyester film comprising:
   a) oriented polyester film; and
   b) a coating of N-acetyl modified polyethyleneimine on at least one surface of said film.

2. The film of claim 1, wherein said N-acetyl modified polyethyleneimine coating is present on a dry weight basis of from about $1 \times 10^{-8}$ to about $2 \times 10^{-5}$ pounds per square foot of film surface.

3. The film of claim 1, having an additional layer of polymer adhered to said N-acetyl modified polyethyleneimine coated surface.

4. The film of claim 3, wherein said additional layer of polymer is polyethylene.

5. The film of claim 3, wherein said additional layer of polymer is an ionomer resin polymer.

6. The film of claim 1 wherein the coating of component b) is applied in-line, on said film in an amount sufficient to adhere a direct extrusion coated polymer to said polyester film.

7. The film of claim 1 wherein the coating of component b) is applied in-line to two opposing surfaces of said polyester film.

* * * * *